Feb. 6, 1945.   R. J. KOPP   2,368,991
AUTOMOBILE LICENSE STAMP HOLDER
Filed April 16, 1942
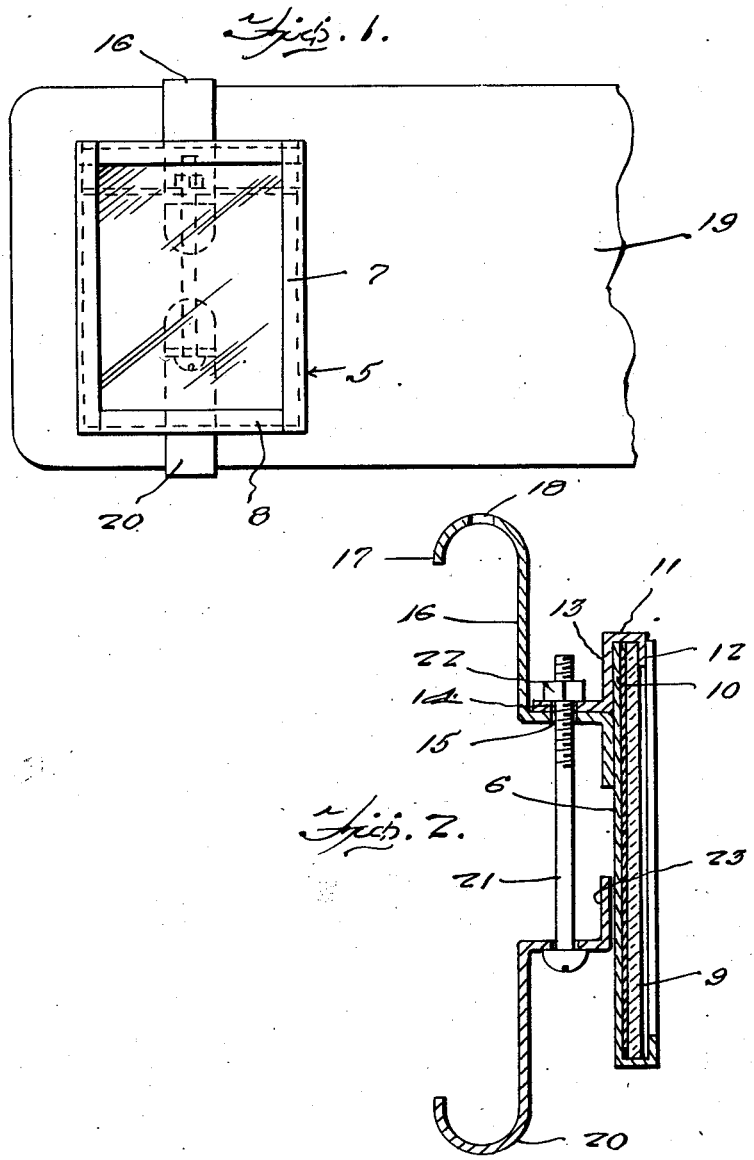
Inventor
Rudolph J. Kopp
By Clarence A. O'Brien
and Harvey B. Jacobson
Attorneys Patented Feb. 6, 1945

2,368,991

UNITED STATES PATENT OFFICE 2,368,991

AUTOMOBILE LICENSE STAMP HOLDER

Rudolph J. Kopp, Sandusky, Ohio

Application April 16, 1942, Serial No. 439,289

1 Claim. (Cl. 40—10)

The present invention relates to new and useful improvements in holders adapted for containing an automobile license stamp, identification card, or the like, and has for its primary object to provide a device of this character adapted for interchangeably clamping the same to a conventional rear view mirror, or for supporting the holder otherwise in a desired position on top of the instrument panel of the automobile, or in any other desired suitable position.

At the present time it is necessary to display a Federal use tax stamp on all motor driven vehicles which must be renewed periodically and it is accordingly an important object of the invention to provide a holder for the stamp which may be secured in a desired position for displaying the stamp for inspection from a position outside of the vehicle, the holder including a removable closure for one end thereof by means of which the stamp may be removed and replaced and in which the closure is held in position by means employed for securing the holder to a rear view mirror or other part of the vehicle.

A further object of the invention is to provide a device of this character adapted for easily and quickly securing the stamp holder in position to a desired part of the automobile and which, at the same time, embodies a simple and practical construction, which is neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a fragmentary rear elevational view of a rear view mirror showing the stamp holder in position thereon and Figure 2 is a vertical sectional view through the holder.

Referring now to the drawing in detail, and with particular reference to Figures 1 and 2, the numeral 5 designates the stamp holder generally which is constructed of a sheet metal backing plate 6 having its side edges bent inwardly upon itself as shown at 7, and with one end edge likewise bent inwardly upon itself, as shown at 8, to form flanges in spaced relation from the backing plate and adapted to receive a glass or other transparent plate 9 behind which is positioned the automobile license stamp or other identification device shown at 10.

The end of the holder opposite from the flange 8 is closed by means of a cover designated generally at 11 and includes an inwardly bent flange 12 which is tightly fitted between the adjacent ends of the flanges 7, as shown to advantage in Figure 2 of the drawing, the back of the cover having an angular bracket 13 extending therefrom and positioned against the back of the backing plate 6. The bracket 13 is formed with an opening 14 adapted to register with an opening 15 formed in a flat hook-shaped member 16 which has one end welded, soldered, or otherwise permanently secured to the backing plate 6. The free end of the member 16 is formed with the hook 17 also having an opening 18 formed therein.

The hook member 17 is adapted to clamp over the upper edge of a rear view mirror of conventional construction, shown at 19, with the holder 5 positioned behind the mirror and engaged under the lower edge of the mirror is a second hook member 20 cooperating with the hook member 17 to form a pair of clamping members, the clamping member 20 having a bolt 21 inserted therethrough and also extending through the openings 14 and 15 of the clamping member 16 and bracket 13, respectively, the bolt being secured in position by means of a nut 22.

The clamping member 20 is free with respect to the holder and is provided with an extension 23 at one end thereof bearing flatly against the back of the backing plate 6.

From the foregoing it will be apparent that the clamping members 16 and 20 will adequately secure the holder in position behind the rear view mirror to hold the automobile license stamps or other identification cards in position thereon.

It will be appreciated that the holder 5 may also be secured in various other desired positions to any suitable part of the automobile.

It is believed the details of construction and manner of use of the device will be readily understood from the foregoing without further detailed explanation.

Having thus described the invention what I claim is:

A holder of the class described comprising a backing plate having a card secured thereto, a clamping member including a hook having an angular inner end disposed against the backing plate and secured thereto, and a second clamping member including a hook having an angular inner end disposed loosely against the backing plate, both of said clamping members including portions disposed at right angles to the backing plate and parallel to each other, and means inserted through said parallel portions for securing the outer ends of the clamping members to opposite edges of the supporting structure.

RUDOLPH J. KOPP.